(12) United States Patent
Yuan et al.

(10) Patent No.: US 9,298,980 B1
(45) Date of Patent: Mar. 29, 2016

(54) IMAGE PREPROCESSING FOR CHARACTER RECOGNITION

(71) Applicant: Amazon Technologies, Inc., Reno, NV (US)

(72) Inventors: Chang Yuan, Seattle, WA (US); Geoffrey Scott Heller, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 51 days.

(21) Appl. No.: 13/789,508

(22) Filed: Mar. 7, 2013

(51) Int. Cl.
*H04N 5/228* (2006.01)
*G06K 9/00* (2006.01)
*G06K 9/32* (2006.01)

(52) U.S. Cl.
CPC .......... *G06K 9/00456* (2013.01); *G06K 9/3258* (2013.01)

(58) Field of Classification Search
None
See application file for complete search history.

(56) References Cited

U.S. PATENT DOCUMENTS

| | | | |
|---|---|---|---|
| 2004/0100567 A1* | 5/2004 | Miller et al. | 348/239 |
| 2005/0163344 A1* | 7/2005 | Kayahara | G06K 9/00442 382/103 |
| 2006/0193536 A1* | 8/2006 | Pilu | 382/298 |
| 2007/0201749 A1* | 8/2007 | Yamauchi et al. | 382/225 |
| 2008/0002916 A1* | 1/2008 | Vincent et al. | 382/305 |
| 2008/0278589 A1* | 11/2008 | Thorn | 348/208.14 |
| 2009/0227283 A1* | 9/2009 | Pylvanainen | G06F 1/1626 455/556.1 |
| 2009/0248692 A1* | 10/2009 | Tsukagoshi et al. | 707/9 |
| 2010/0189354 A1* | 7/2010 | de Campos | G06K 9/00597 382/190 |
| 2010/0293460 A1* | 11/2010 | Budelli | 715/702 |
| 2011/0267490 A1* | 11/2011 | Goktekin et al. | 348/222.1 |
| 2011/0287811 A1* | 11/2011 | Mattila | G06K 9/4671 455/566 |
| 2012/0087537 A1* | 4/2012 | Liu et al. | 382/100 |
| 2012/0134588 A1* | 5/2012 | Zhang et al. | 382/176 |
| 2012/0301014 A1* | 11/2012 | Xiao | G06K 9/4676 382/159 |
| 2013/0084013 A1* | 4/2013 | Tang | 382/195 |
| 2013/0101210 A1* | 4/2013 | Tang | 382/165 |
| 2013/0148910 A1* | 6/2013 | Fredembach | 382/275 |
| 2013/0155309 A1* | 6/2013 | Hill | H04N 5/23212 348/333.11 |
| 2013/0156265 A1* | 6/2013 | Hennessy | 382/103 |
| 2013/0293735 A1* | 11/2013 | Suzaki | H04N 5/23219 348/222.1 |
| 2014/0233860 A1* | 8/2014 | Kis | G06K 9/4671 382/201 |
| 2015/0055824 A1* | 2/2015 | Hong | G06K 9/00624 382/103 |

* cited by examiner

*Primary Examiner* — Twyler Haskins
*Assistant Examiner* — Wesley J Chiu
(74) *Attorney, Agent, or Firm* — Novak Druce Connolly Bove + Quigg LLP

(57) ABSTRACT

Various embodiments provide an image pre-processing method to accelerate image computing tasks. For example, an image is obtained from a camera of a portable computing device. Salient features of the image are identified by a number of techniques, such as identifying feature points, identifying gradients within the image, and other techniques and methods discussed herein. Based at least in part on the identified salient features, a saliency map of the image is computed. The saliency map includes a saliency value for each of at least a portion of the plurality of pixels. In this example pixels above a threshold saliency value are processed with an optical character recognition engine.

16 Claims, 9 Drawing Sheets

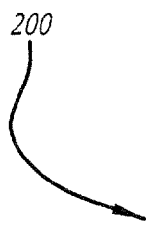
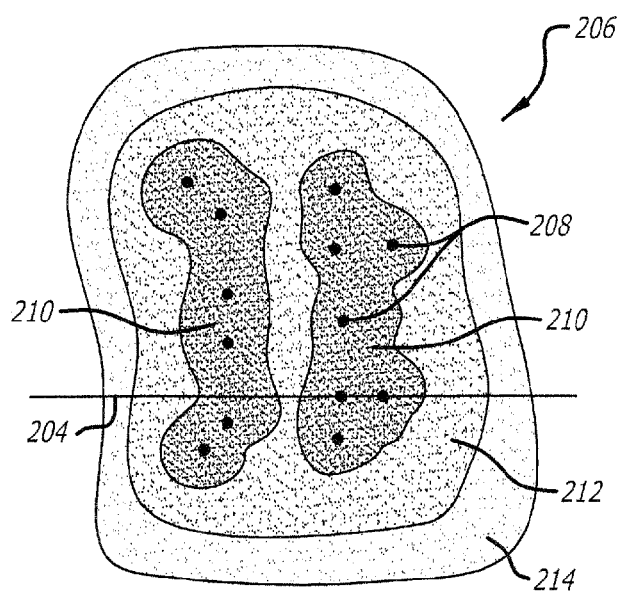
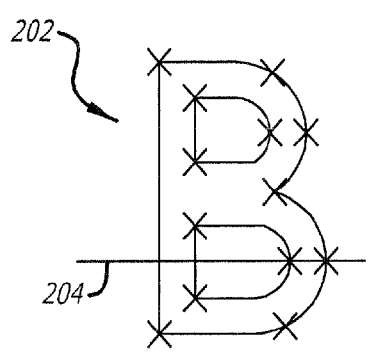
FIG. 2A
FIG. 2B
FIG. 2C
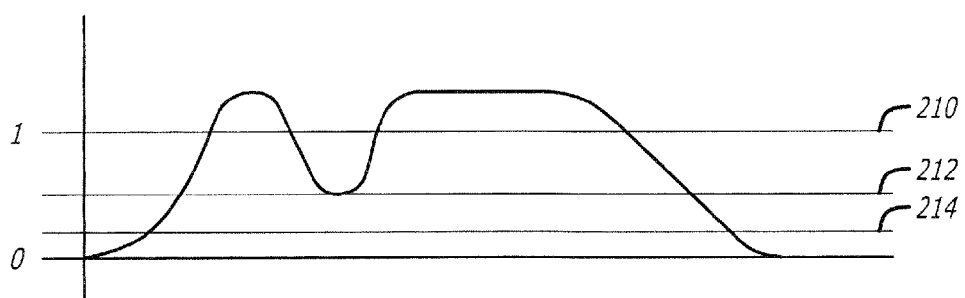
FIG. 2D

IMAGE PREPROCESSING FOR CHARACTER RECOGNITION

BACKGROUND

Optical character recognition (OCR) systems are generally used to detect text present in an image and to convert the detected text into its equivalent electronic representation. In order to accurately recognize text with a conventional OCR engine, the image typically needs to be of a high quality. The quality of the image depends on various factors such as the power of the lens, light intensity variation, relative motion between the camera and text, focus, and so forth. Generally, an OCR engine can detect a majority of text characters in good quality images, such as images having uniform intensity, no relative motion, and good focus. However, even with good quality images, conventional OCR engines are still often unable to accurately detect all text characters. This imprecision is further exacerbated when attempting to recognize text from images containing variations in lighting, shadows, contrast, glare, blur, and the like. Further, efficient implementation of these OCR engines is a challenge, despite the rapid growth of mobile computational power due to ever-increasing image resolution, video frame rate, and increasing algorithmic complexity. Therefore, as technology advances and as people are increasingly using portable computing devices in a wider variety of ways, it can be advantageous to adapt the ways in which images are processed in order to improve visual recognition precision and computing efficiency of the same.

BRIEF DESCRIPTION OF THE DRAWINGS

Various embodiments in accordance with the present disclosure will be described with reference to the drawings, in which:

FIGS. 2A-2E illustrate an example visual representation of a process of recognizing text in accordance with at least one embodiment;

DETAILED DESCRIPTION

Systems and methods in accordance with various embodiments of the present disclosure may overcome one or more of the aforementioned and other deficiencies experienced in conventional approaches to processing images for visual recognition. In particular, various approaches provide an image recognition method to accelerate image processing and/or analysis tasks. For example, a pixel level saliency map of an image taken with a camera of a computing device can be generated. As discussed herein, a saliency map is a topographically arranged map that represents visual saliency of a corresponding visual scene within an image. The salience or saliency of an object, a pixel, etc. is the state or quality by which it stands out relative to its neighbors. Saliency at a given location in the image is, therefore, determined primarily by how different this location is from its surroundings in color, orientation, motion relative to other frames, depth, and the like. Various algorithms or processes can be used to identify and locate salient features within an image to generate the saliency map. For example, the salient features can be identified based on feature points, image gradients, maximally stable extremal regions (MSERs), Stroke Width Transform (SWT), or any other such feature detection algorithm. Once salient features are identified, the pixel values of the identified are features are used as input to produce a saliency value output between 0 and 1. Pixels or regions including multiple pixels with higher saliency values are processed first and those with lower saliency values will be processed later or possibly even skipped. In other words, complex tasks, such as recognizing text, do not necessarily need to be made on pixels with zero or low saliency values, which can improve the speed of existing image computing algorithms with minimum effect on their corresponding accuracy.

Various other functions and advantages are described and suggested below as may be provided in accordance with the various embodiments.

Figure 1:
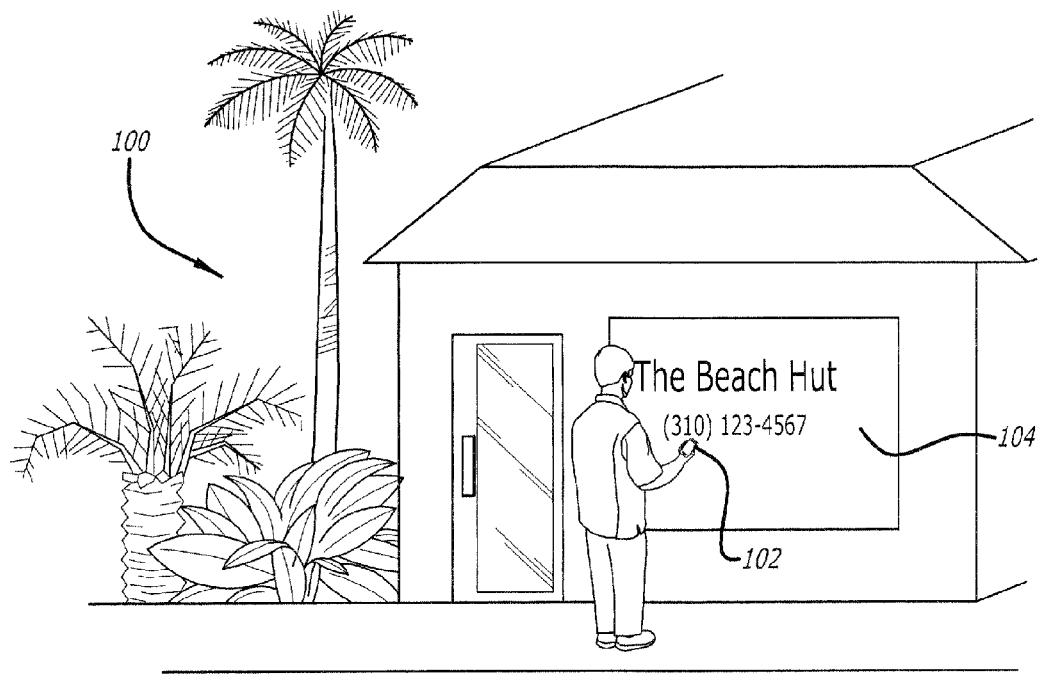
FIG. 1 illustrates an example situation where a user is attempting to recognize text with a computing device in accordance with various embodiments.

FIG. 1 illustrates an example situation 100 in which a user is attempting to recognize text (e.g., strings of one or more alphanumeric characters) in an image taken with camera of a computing device 102 on a window 104, in accordance with at least one embodiment. Although a smart phone is shown, it should be understood that various other types of electronic or computing devices that are capable of determining and processing input can be used in accordance with various embodiments discussed herein. These devices can include, for example, tablet computers, notebook computers, desktop computers, personal data assistants, electronic book readers, video gaming controllers, and portable media players, among others. The portable computing device 102 in this example includes a camera and an interface (e.g., a display element) that displays the field of view of the camera. The camera can include a lens and an image sensor that converts an optical image into an electrical signal. The portable computing device 102 can be aimed in different directions and the interface can display an image of the current/active field of view being captured by the camera.

Since the user is walking, in this example, obtaining an accurate optical character recognizer (OCR) or other visual recognition output can be a challenge. The outside world is filled with less than ideal conditions, such as poor or varied lighting, movement during image capture, and other circumstances, that make capturing an image ideal for processing by a conventional OCR or other visual recognition algorithm difficult. Further, given people's busy schedules, taking the time and care to capture an ideal image in a moving environment, such as in a user's hand, is not necessarily practical and likely not to be expected. Since only a small fraction of pixels in an input image correspond to text regions, it is desirable to focus computation on salient features or regions of interest of the image and possibly eliminate non-text regions prior to processing the image with an OCR engine.

Therefore, in at least one embodiment, an image is captured by a camera of the portable computing device 102 and salient features of the image are identified. Once these the salient features are identified, a saliency map is computed based thereon. FIG. 2A illustrates an example image 200 of an image captured by the camera of the computing device 102. In this example, a processing component of the computing device 102 (or processing component of a remote server in contact over a network therewith) can implement algorithms that can identify salient features of the image. The salient features, as discussed herein, can include at least one of sharp transitions in pixel values, such as areas with strong pixel gradients, and/or feature points, such as corners and other transitions in line direction, intensity, color, intersection points, local minima, or maxima, and the like. Based at least in part on the identified salient features, a saliency map of the image can be computed that assigns saliency values between 0 and 1, in at least one example, to each of at least a portion of the image's pixels. Accordingly, after the saliency values have been assigned, pixels having a saliency value above a threshold value are processed by a visual recognition algorithm, such as an optical character recognizer, in this example. Alternatively, all the pixels of the image 200 can be processed. In one example, pixels with a higher saliency value could be processed ahead of, or prioritized over, pixels with a lower saliency value. In at least another example, pixels with higher saliency values, or values above a threshold value can be processed more intensely, more thoroughly, or with greater precision relative to pixels with lower pixel values.

In at least one embodiment, in order to identify the salient features of the image 200, feature points are computed by applying a feature point detection algorithm, such as a Harris, FAST, FERNS, SIFT, or SURF. The feature points are typically interesting or relatively unique features (at least locally) of the image 200 that tend to be indicative of an area associated with salient features and, therefore, are used as a guide, in one example, to compute the saliency map. For example, FIG. 2B illustrates an example illustration 202 of the 'B' from FIG. 2A marked with feature points as identified by a feature point detection algorithm. Depending on the algorithm and desired precision, more or less feature points can be identified than are shown in the illustration 202.

After identifying the feature points, the distance between feature points can be computed by a distance transform. Therefore, in at least one embodiment, the saliency values can be determined by assigning a value based on the distance to the closest feature point. For example, the saliency value=exp (−lamdba*distance_to_closest_feature_point), where lambda is a constant scaling factor. In this example, the saliency values will be highest directly adjacent the feature points and the values will drop off and become lower in accordance with an exponential decay. FIG. 2C is, therefore, an illustrative example of a saliency map 206 of the 'B' illustration 202 for explanation purposes only. In this example, the first value regions 210 directly adjacent the feature points 208 is assigned the highest value based on the saliency value equation above. Accordingly, the saliency values become lower in the second value region 212 and the third value region 214 for pixels farther away from a feature point 208.

Figure 2E:
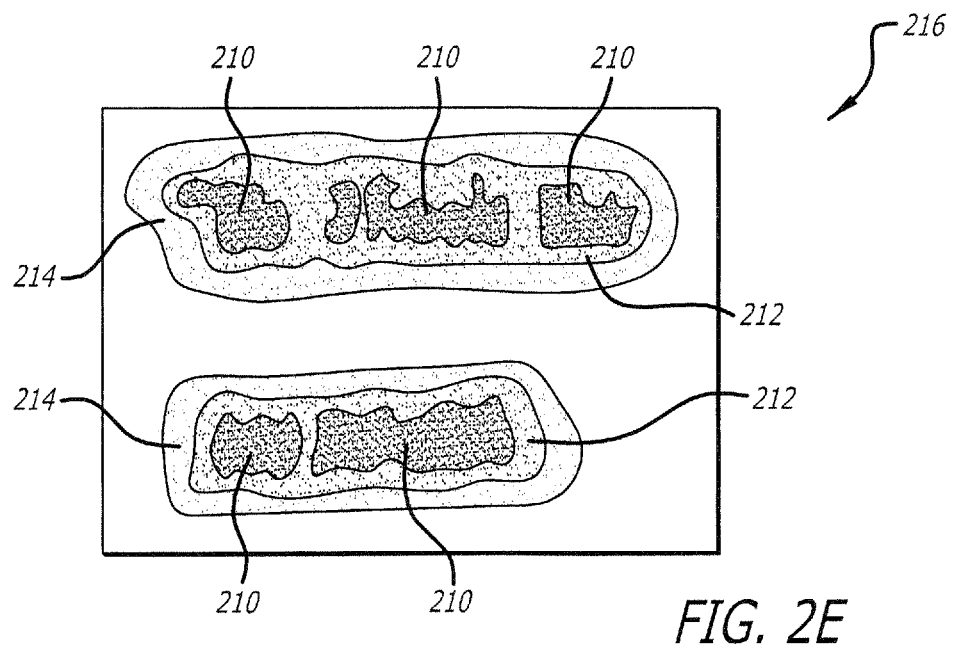

Further, with respect to FIGS. 2B-2D, is a line 204 used to illustrate the varying levels of saliency values for the '13' of illustration 202. In this example, the line cuts through a cross-section of the 'B' and the saliency map 206 and a graph of the varying saliency values is show in FIG. 2D. In this example, the first value regions 210 is shown as the peaks of the graph and the third value region 214 is shown as a region encompassing the whole character 'B' and some additional area adjacent thereof. Accordingly, FIG. 2E illustrates a saliency map 216 for the whole image 200. In one example, the salient value associated with the third value region 214 could be defined as the threshold value, such that each region with at least the salient value associated with the third value region 214 is either exclusively processed by the OCR engine, prioritized by the OCR engine, or processed more intensively than other parts of the image 200. However, to save computing resources, the salient value associated with the second value region 212 could be chosen, which could also possibly lower recognition accuracy.

In at least one embodiment, the density of the feature points could also be used to determine the saliency values of the saliency map 216. For example, the image 200 could be broken up into rectangular/square regions where the saliency_value=number_of_feature_points/area_of_the_rectangle/square. For example, referring back to FIG. 2C, the region 210 of the saliency map 206 corresponds to a plurality of regions having a relevant feature point density. However, since the region 210 would be composed of individual squares or rectangles, it would not appear as smooth or round as illustrated compared to using an exponential decay function to assign the saliency values.

In at least one embodiment, FIG. 2E could also illustrate an example of a saliency map computed based on intensity gradients of the image 200. Many image computing tasks, by design, react to strong gradient or edge regions and regions without much change in intensity tend to not yield meaningful results. Image gradients tend to be indicative of an area associated with salient features and, therefore, can also used as a guide to compute the saliency map. Image gradient filters, such as a Sobel filter, Scharr filter, Laplace filter, and the like, can be applied to generate and identify the gradients within the image 200 resulting in an image gradient map. The image gradient map can be refined or smoothed by applying a filter technique, such as a Gaussian smoothing filter or a box filter. The gradient values can then be normalized to [0, 1] range as saliency values in a few different ways. For example, the gradient values can be normalized by a direct linear normalization where the saliency_value=(gradient−gradient_min)/(gradient_max−gradient_min). At least one other example, the saliency values can be computed by applying an exponential function to the original gradient values where the saliency_value=exp (−lambda*gradient), where lambda is a pre-selected scaling factor.

Figure 3:
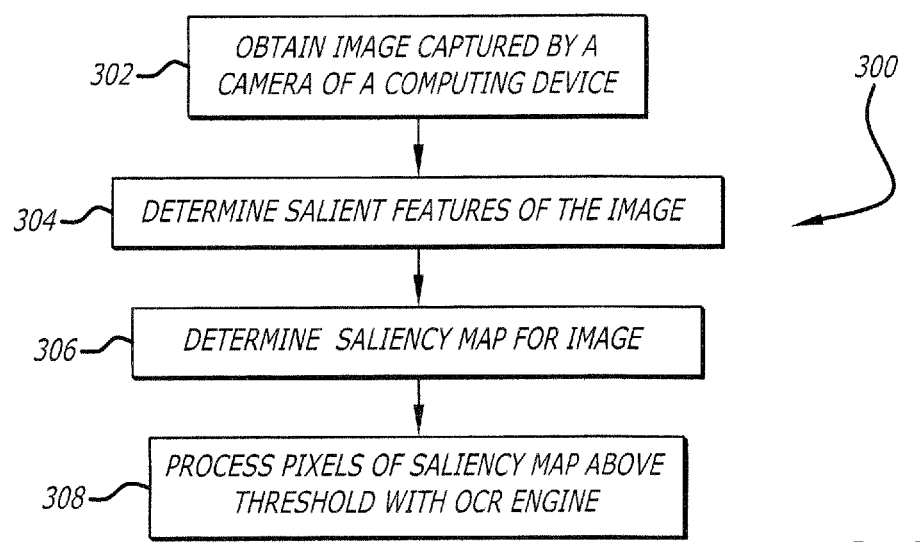
FIG. 3 illustrates an example process for recognizing text in accordance with at least one embodiment.

FIG. 3 illustrates an example preprocessing method 300 that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, an image captured by a camera of a portable computing device is obtained 302. The image includes pixel values for a plurality of pixels of the camera. Salient features of the image are determined 304 or pixel values indicative of one or more salient features, or regions of interest, in the image can be identified. As discussed above, the salient features can be identified by any number of techniques, such as identifying feature points, identifying gradients within the image, identifying maximally stable extremal regions (MSERs), utilizing a Stroke Width Transform (SWT), and any other techniques, algorithms, and methods for detecting features in an image. Further, statistical models learned from previous images in a sequence of images can also be used to identify or predict the location of the salient features in subsequent image frames in the sequence. Other machine learning and neural network algorithms or techniques may also be used. In this example, a saliency map of the image is determined 306 including a saliency value for each of at least a portion of the plurality of pixels based at least in part on the identified salient features. Other methods and preprocessing techniques discussed or suggested herein may also be applied. Finally, in this example pixels of the saliency map above a threshold saliency value are processed 308 with an optical character recognizer. In at least one embodiment, the threshold value could be 0 where each of pixel, or group of pixels defining a region, are processed with pixels or regions having a higher saliency values are prioritized by the OCR engine, or processed more intensively than other parts of the image. Various other preprocessing approaches can be used as well as discussed or suggested elsewhere herein.

Figure 4:
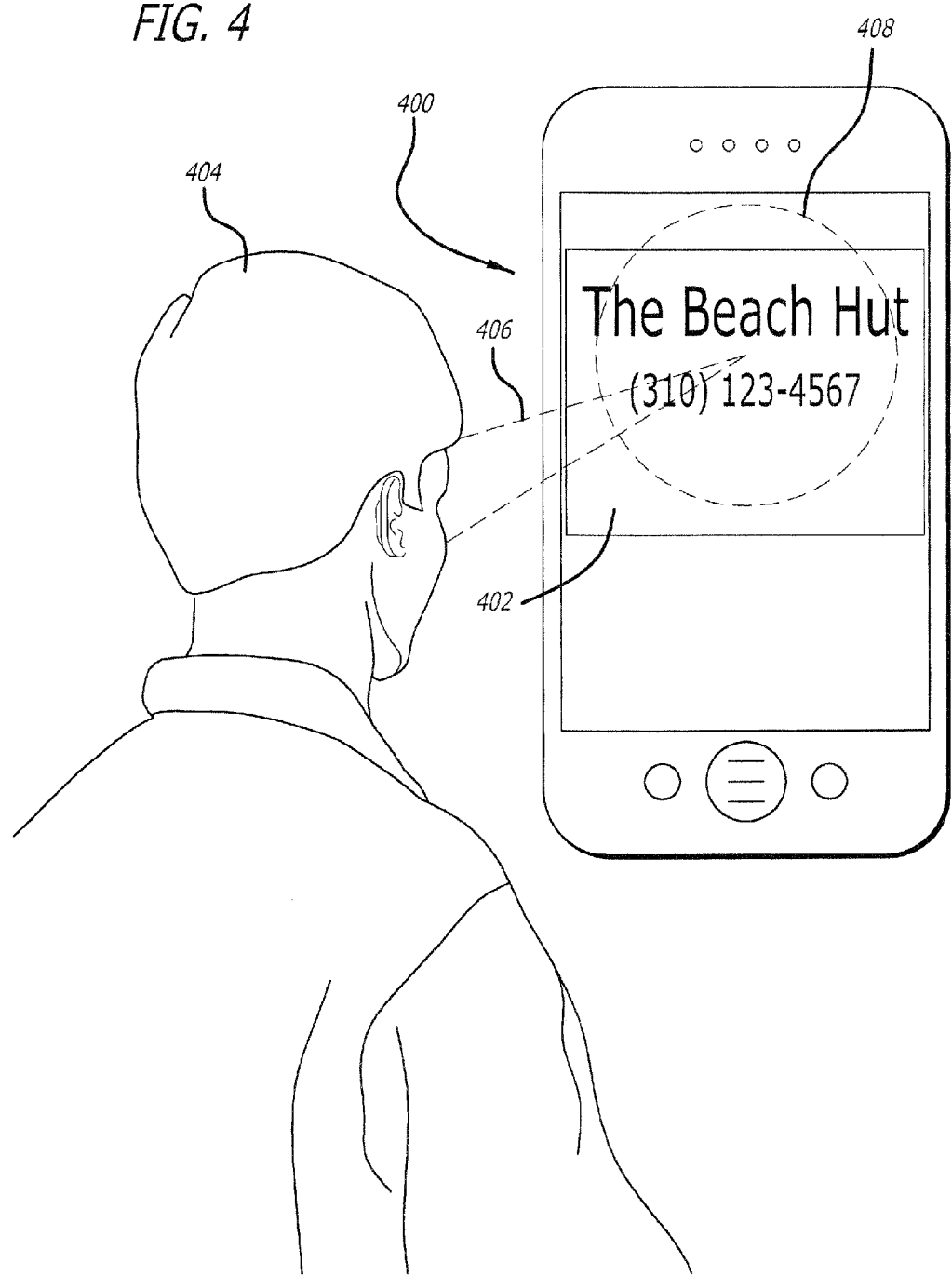
FIG. 4 illustrates an example situation of identifying salient region(s) of an image using gaze in accordance with at least one embodiment.

FIG. 4 shows an example situation of a user 404 viewing an image 402 displayed on computing device 400 to illustrate another image preprocessing technique, in accordance with at least one embodiment. In at least some embodiments one or more salient features or regions of the image 400 are located where human eyes would virtually focus on or gravitate to and the saliency values associated therewith should be stronger in and around these salient features or regions of the image 400. There are multiple methods to identify the one or more salient features. In one example, user gaze and eye tracking can be utilized. For example, gaze of a user's eyes lead to a pair of virtual rays that intersect at a point on the display screen of the computing device 400 and the intersection(s) can be treated as the salient features. Accordingly, the saliency values associated with the location(s) of intersection are assigned higher saliency values based on the assumption that a user's eyes are immediately drawn to the salient features of the image and that these features tend to hold the user's attention. Therefore, in this example, the user 404 is viewing the image 402 displayed on computing device 400 and the user's gaze 406 intersects a point substantially in the middle of the text region of the image 402. Accordingly, the saliency value at this point of intersection will be highest. As discussed above, the saliency values may then fade or decay away from these salient features to encompass a priority processing region 408 that will be either exclusively processed by the OCR engine, prioritized by the OCR engine, or processed more intensively than other parts of the image 400.

Figure 5A:
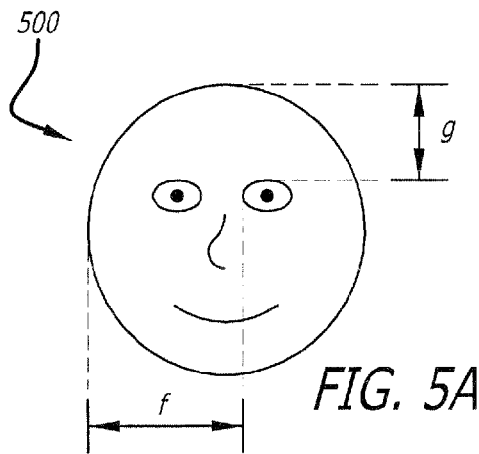
FIGS. 5A-5F illustrate examples of determining gaze direction of a user that can be utilized in accordance with various embodiments.
Figure 5B:
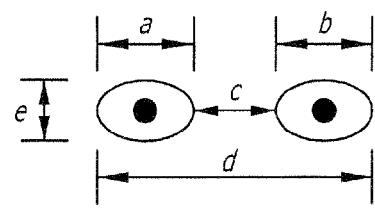
Figure 5C:
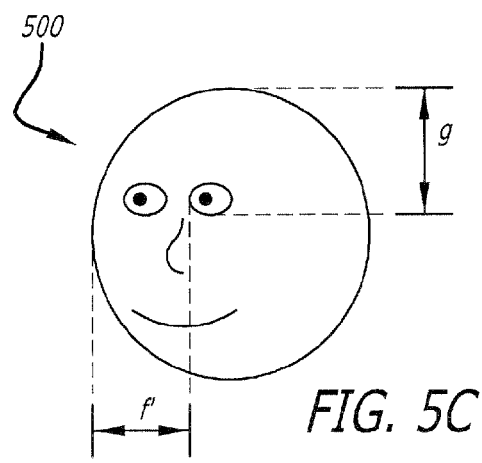
Figure 5D:
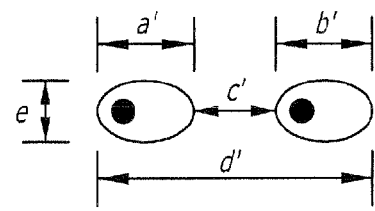
Figure 5E:
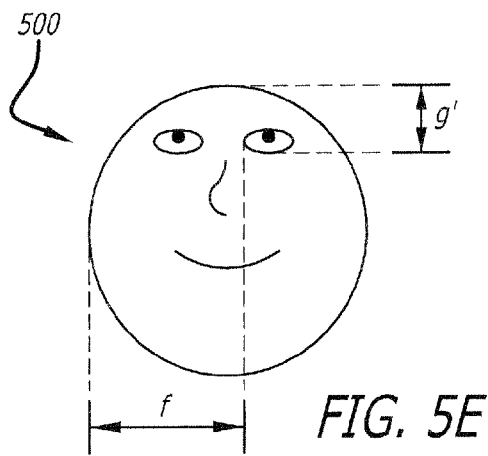
Figure 5F:
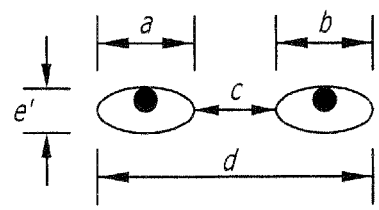

In order to determine the gaze direction of a user for such a process, the computing device 400 in at least some embodiments has to determine the relative position of the user 404 relative to the device, as well as dimensions or other aspects of the user at that position. FIGS. 5A-5B illustrates an example 500 wherein images are captured and analyzed to determine the relative positions of the user's head and the user's eyes. In a system wherein the algorithm is able to differentiate the user's pupils, the system can also utilize the relative position of the pupils with respect to the eye position. For example, FIGS. 5C-5D illustrates a case where the user is looking "left" (or to the user's right"), such that a center point of each user's pupil is to the left (in the image) of the center point of the respective eye. Similarly, FIGS. 5E-5F illustrates a case where the user is looking "up". As can be seen, the positions of the pupils have moved above a center point of the eyes. The position of the pupils can change without the user moving his or her head. Thus the system may be able to, in some embodiments, detect a glance without a change in head position. A system in accordance with one embodiment can take advantage of such information by adjusting the display of the computing device according to the detected position of the user's pupils relative to the user's eyes, and thus the determined area on the display at which the user is looking.

Figure 6:
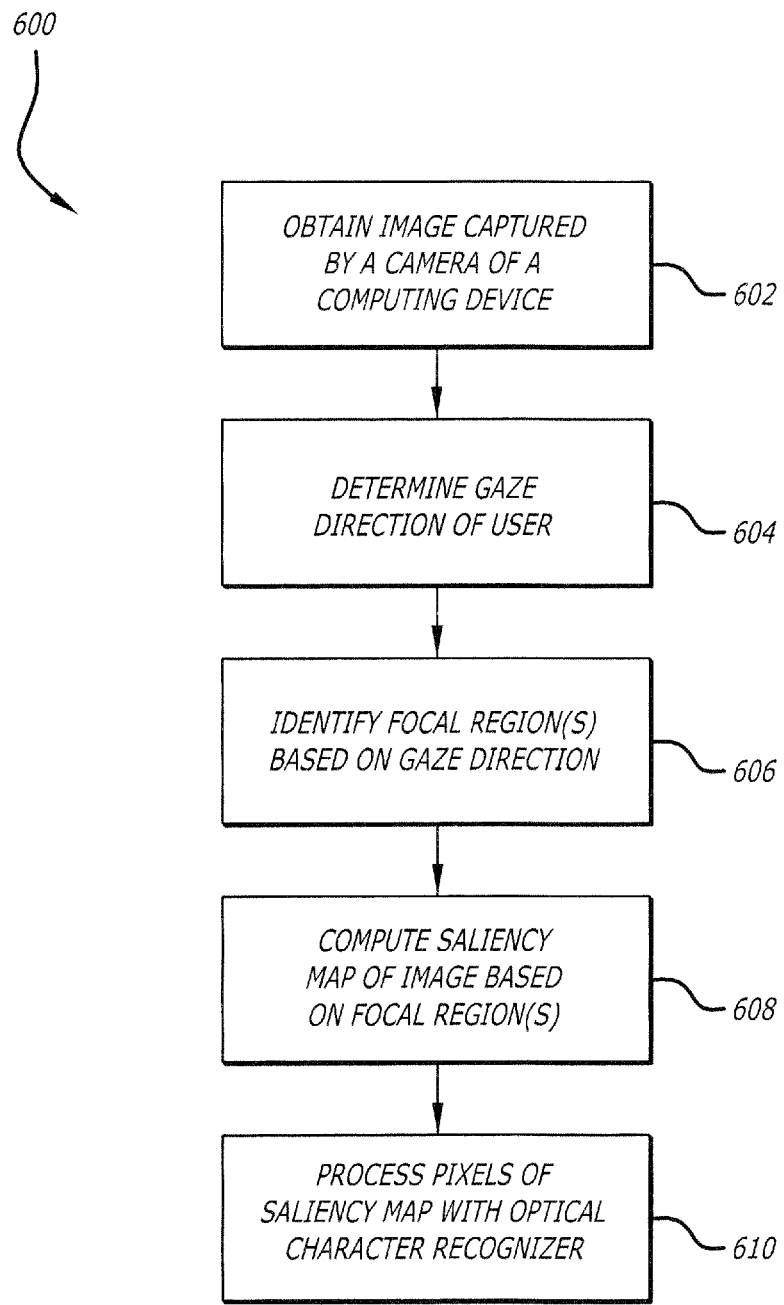
FIG. 6 illustrates an example process of recognizing text in accordance with at least one embodiment.

FIG. 6 illustrates an example preprocessing method 600 that can be used in accordance with various embodiments. In this example, an image captured by a camera of a portable computing device is obtained 602 and a gaze direction of a user is determined 604. Determining the gaze direction, in at least one example, includes capturing image information of the user to determine one or more locations on a display screen where a pair of virtual rays originating from the user's eyes intersect. In this example, one or more salient regions of the image are identified 606 based at least in part on the gaze direction of the user. Based on the one or more salient regions, a saliency map of the image including a saliency value for each of at least a portion of a plurality of pixels associated therewith is computed 608. In at least one example, areas associated with one or more salient regions are assigned higher saliency values relative to other areas. Further, saliency values are assigned based one or more functions discussed elsewhere herein where areas adjacent the one or more salient regions are assigned higher saliency values than areas a distance away. In this example, pixels above a threshold saliency value are processed 610 with an optical character recognizer. Alternatively, all pixels could be processed with pixels assigned a high saliency being prioritized over pixels with lower saliency values or the pixels with a higher saliency could be processed more intensely or thoroughly.

In one example, user input, such as a user clicking or touching on a certain part of a touch screen of the computing device could define the one or more salient regions. In another example, a feature or object at the center of an image can be automatically assigned high (or the highest) saliency values based on the assumption that a user will focus and/or aim a camera of the computing device on the main object or feature of interest therein. In this example, a circle or concentric rings of like saliency values can be automatically assigned to pixels of the image or pixels connected to the focal object or feature can be assigned the same saliency values. Further, visual attention estimation algorithms developed in the human vision science and neuroscience fields can be used to estimate portions of an image that are likely to hold or catch a user's attention. These algorithms can automatically detect the visual attention points in in images. Various other preprocessing approaches can be used as well as discussed or suggested elsewhere herein.

Further, the original saliency map can be further refined or cleaned-up by a thresholding algorithm or method, such as adaptive thresholding or Otsu thresholding, in order to highlight pixels with saliency values above a threshold value and to eliminate pixels with lower saliency values. Additionally, the saliency map, in some situations, can be converted into a binary mask image to further speed up the OCR processing. One special case of the saliency map is a binary mask image where pixels for processing are given a 1 value and the remainder of the pixels are given a 0 value.

Another such refinement includes a coarse-to-fine estimation of a saliency map. Namely, an image pyramid can be built by downsampling the original image to L levels, where level 0 is the original image, level 1 is downsampled once, and level L is the smallest image. A saliency map can be computed based on the original image level L and then upsampled to match the image at level L−1. Only those pixels with saliency values that are different than their neighbors are computed again—intuitively if a pixel has a different saliency value than its neighbors, it is likely that there is more detailed information around this pixel that needs to be computed or explored at a finer level. This process can be continued until the original level 0 value is reached. Based on the assumption that most parts of the images are uniform with smooth saliency measures and the saliency measures computed from a coarse level will be sufficient, this scheme can save at least some computation time.

In at least one embodiment, hierarchical spatial configurations, such as quad-tree can be utilized to save at least some computation time. The original image can be divided into, for example, 4 parts or quadrants and this process can be repeated until the new quadrants are small than a predetermined size, effectively dividing the original image into a quad-tree structure. The saliency estimation process can then be applied to quadrants at smallest sizes and the saliency maps can be upsampled and composed to generate the final map. Again, based on the assumption that most part of images are uniform and do not contain scale-variant information, this scheme can save at least some computation time.

Figure 7:
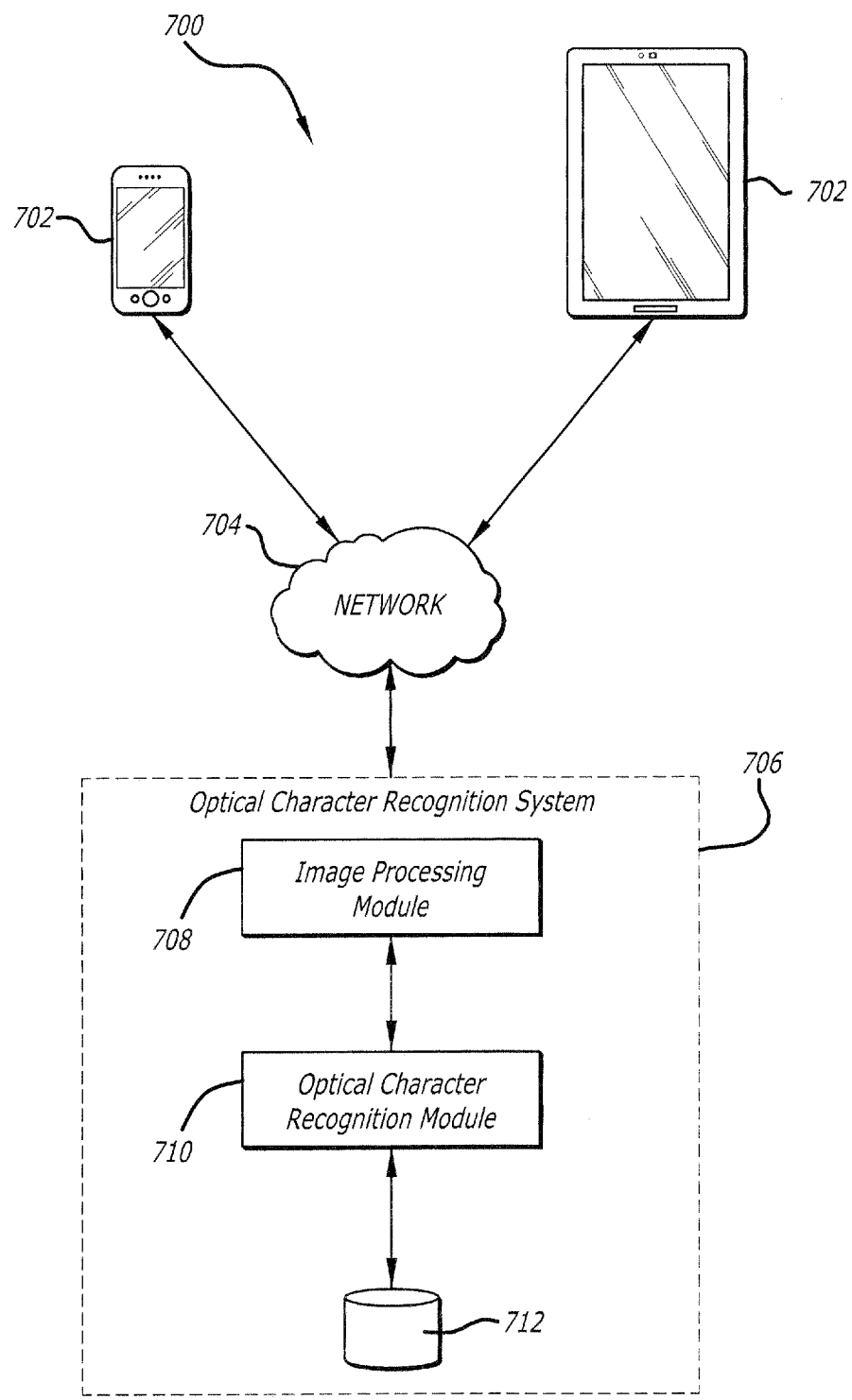
FIG. 7 illustrates an example environment in which various embodiments can be implemented.

FIG. 7 is an example environment 700 in which a user can utilize a computing device to recognize text, in accordance with various embodiments. It should be understood that the example system is a general overview of basic components, and that there can be many additional and/or alternative components utilized as known or used in the art for recognizing text in multiple images. In this example, a user is able to utilize a client device 702, such as a personal computer, tablet computer, smart phone, and the like, to access an Optical Character Recognition system or service 706 over at least one appropriate network 704, such as a cellular network, the Internet, or another such network for communicating digital information. The client device 702 can capture one or more images (or video) of text and send the images to the Optical Character Recognition system or service 706 over the at least one appropriate network 704. The Optical Character Recognition system 706 includes an image-processing module 708 that can apply different operators or techniques to pre-process the images before submitting the images to one or more optical character recognition modules 710. Examples of the operators include a Laplacian-or-Gaussian filter, thresholding filters, and so forth, which enhance or mitigate different characteristics of the images. Examples of these characteristics include intensity, blurriness, and so forth. After pre-processing, the one or more recognition engines of the optical character recognition module 710 concurrently recognizes text from the image to produce multiple recognized text outputs. In at least one embodiment, a processor can analyze the recognized text using a database 712 of words in order to improve the recognition. The database 712 includes a set of words which the processor can search for matches corresponding to words present in the recognized text. At least a portion of these tasks can be performed on a portable computing device or by using at least one resource available across a network as well. In at least some embodiments, an OCR application will be installed on the client device 702, such that much of the processing, analyzing, or other such aspects can be executed on the client device. Various processing steps can be performed by the client device 702, by the Optical Character Recognition system 706, or a combination thereof. Therefore, it should be understood that the components and capabilities of the Optical Character Recognition system 706 could wholly or partly reside on the client device 702.

Figures 8A, 8B:
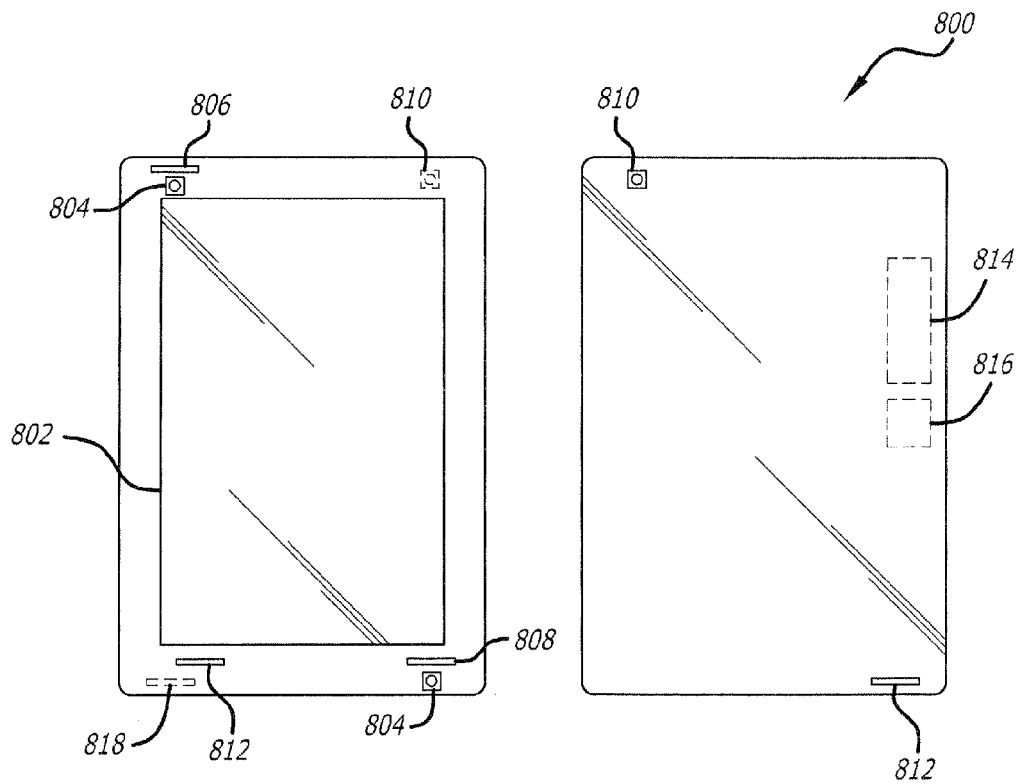
FIGS. 8A and 8B illustrate an example computing device that can be used to implement aspects of various embodiments.

FIGS. 8A and 8B illustrate front and back views, respectively, of an example electronic computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display element of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
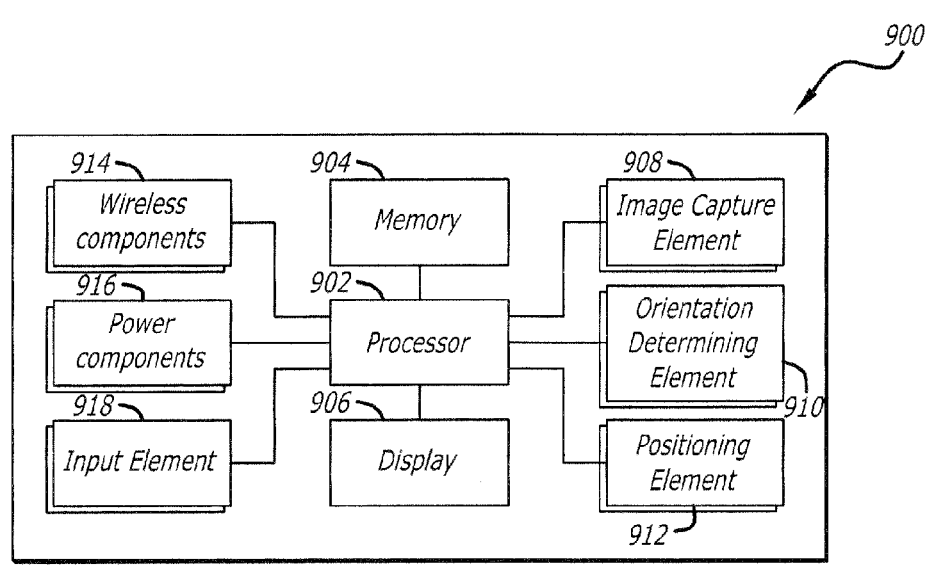
FIG. 9 illustrates example components that can be used with a device such as that illustrated in FIGS. 8A and 8B.

FIG. 9 illustrates a set of basic components of an electronic computing device 900 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices. The device typically will include some type of display element 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 10:
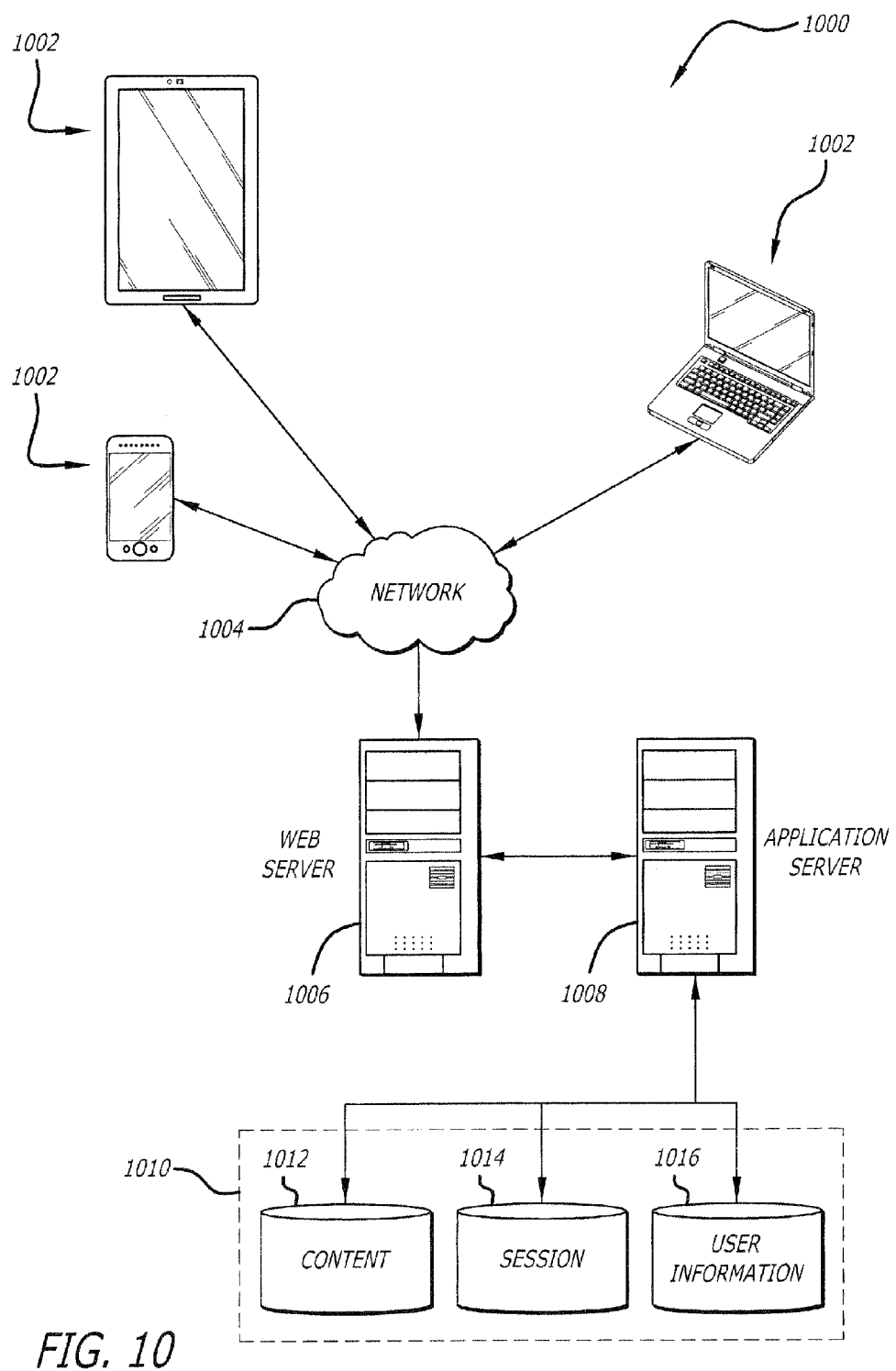
FIG. 10 illustrates an environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising
under control of one or more computer system configured with executable instructions,
obtaining image data from a camera of a portable computing device;
determining at least one feature point of the image data using a feature point detection algorithm;
applying a saliency function to the at least one feature point to determine at least one corresponding saliency value for at least a portion of the image data, wherein the saliency function is a feature point density function programmed to calculate a number of feature points per area, areas with a higher density of feature points having a higher saliency value relative to areas with a lower density of feature points;
generating a saliency map of the image data based at least in part on the at least one corresponding saliency value;
determining at least one region of the saliency map in which the at least one corresponding saliency value meets or exceeds a saliency threshold value; and
selecting the at least one region of the saliency map to be analyzed using a visual recognition component.

2. The computer-implemented method of claim 1, wherein the saliency function generates the at least one corresponding saliency value based on a distance from each feature point, and wherein the at least one corresponding saliency value is highest at each feature point and decreases exponentially with the distance away from each feature point.

3. A computer-implemented method, comprising
under control of one or more computer system configured with executable instructions,
obtaining image data;
displaying an image associated with the image data on a display screen;
capturing image information of a user to determine at least one gaze location of the user on the display screen;
identifying pixel values of an area indicative of a salient feature, wherein identifying the pixel values of the area is based at least in part on the at least one gaze location on the display screen;
generating a saliency map of the image data based at least in part on the at least one gaze location, wherein first saliency values associated with the at least one gaze location is higher than second saliency values associated with a remainder of the image data, and wherein the second saliency values are based at least in part upon an exponential decay function;
selecting at least one saliency value of the first saliency values that is greater than a threshold value;
determining at least one region corresponding to the at least one saliency value; and
processing the at least one region with a visual recognition algorithm.

4. The computer-implemented method of claim 3, further comprising:
generating an image gradient map by analyzing intensity gradients associated with at least a portion of the image data with an image gradient filter;
wherein the saliency map is generated based at least in part upon the image gradient map.

5. The computer-implemented method of claim 4, further comprising:
refining the image gradient map with a Gaussian smoothing filter or a box filter, wherein the image gradient filter is at least one of a Sobel filter, a Scharr filter, or a Laplace filter.

6. The computer-implemented method of claim 4, further comprising:
thresholding the image data to at least omit saliency values below a minimum threshold value.

7. The computer-implemented method of claim 3, wherein the first saliency values are determined based at least in part by at least one of identifying feature points, identifying image gradients, identifying maximally stable extremal regions (MSMRs) within the image data, or by applying a Stroke Width Transform (SWT).

8. The computer-implemented method of claim 3, wherein the first saliency values are more intensely processed by the visual recognition algorithm relative to the second saliency values.

9. The computer-implemented method of claim 3, wherein the gaze location is determined by tracking eyes of the user, the direction of each eye being associated with a pair of virtual rays intersecting at the at least one gaze location on the display screen.

10. A computer device, comprising:
a processor;
an imaging element;

a display screen; and memory including instructions that, when executed by the processor, cause the computing device to:
- obtain image data captured by the imaging element of the computing device;
- identify at least one salient feature of the image data, wherein identifying the at least one salient feature includes determining feature points of the image data with a feature point detection algorithm;
- apply a saliency function to each of the determined feature points to generate at least one saliency value, wherein the saliency function is a feature point density function programmed to calculate a number of feature points per area, wherein areas with a higher density of feature points having a higher saliency value relative to areas with a lower density of feature points;
- generate a saliency map of the image data by compiling the at least one saliency value for at least a portion of the image data based at least in part upon the at least one salient feature on a distance from the at least one salient feature wherein the saliency values are highest and decrease exponentially with the distance away from the at least one salient feature;
- determine at least one region corresponding to the at least one saliency value greater than a threshold value; and
- process the at least one region with a visual recognition algorithm.

11. A non-transitory computer-readable storage medium storing instructions that, when executed by at least one processor, cause a computing device to:
- obtain image data captured by an imaging element of a computing device;
- display an image associated with the image data on a display screen;
- capture image information of a user to determine at least one gaze location of the user on the display screen;
- identify pixel values of an area indicative of at least one salient feature of the image, wherein identify the pixel values of the area is based at least in part on the at least one gaze location of the user on the display screen;
- generate a saliency map of the image data based at least in part on the at least one gaze location, wherein first saliency values associated with the at least one gaze location are higher than second saliency values associated with a remainder of the image data, and wherein the second saliency values are based at least in part upon an exponential decay function;
- select at least one saliency value of the first saliency values that is greater than a threshold value;
- determine at least one region corresponding to the at least one saliency value; and
- process the at least one region with a visual recognition algorithm.

12. The non-transitory computer-readable storage medium of claim 11, wherein the instructions that, when executed by at least one processor, cause the computing device to:
- generate an image gradient map by analyzing one or more image intensity gradients of the image data with an image gradient filter to identify the at least one salient feature.

13. The non-transitory computer-readable storage medium of claim 11, wherein the gaze location is determined by tracking gaze of each eye of the user, the direction of each eye being associated with a pair of virtual rays intersecting at the at least on gaze location on the display screen.

14. The computer device of claim 10, wherein the instructions that, when executed by the processor, further cause the computing device to:
- generate an image gradient map by analyzing intensity gradients associated with at least a portion of the image data with an image gradient filter, wherein the saliency map is generated based at least in part upon the image gradient map.

15. The computer device of claim 14, wherein the instructions that, when executed by the processor, further cause the computing device to:
- refine the image gradient map with a Gaussian smoothing filter or a box filter, wherein the image gradient filter is at least one of a Sobel filter, a Scharr filter, or a Laplace filter.

16. The computer device of claim 10, wherein the instructions that, when executed by the processor, further cause the computing device to:
- threshold the image data to at least omit saliency values below a minimum threshold value.

* * * * *